United States Patent [19]

Blatt

[11] Patent Number: 4,998,459
[45] Date of Patent: Mar. 12, 1991

[54] RODLESS FLUID ACTUATED MOTOR WITH IMPROVED SEALING CHARACTERISTICS

[76] Inventor: John A. Blatt, 47 Willison, Grosse Pointe Shores, Mich. 48236

[21] Appl. No.: 410,818

[22] Filed: Sep. 22, 1989

[51] Int. Cl.$^5$ ............................................. F01B 29/00
[52] U.S. Cl. .................... 92/88; 277/DIG. 7
[58] Field of Search ....................... 92/88; 277/DIG. 7

[56] References Cited

U.S. PATENT DOCUMENTS

| | | | |
|---|---|---|---|
| 3,221,610 | 12/1965 | King et al. | 92/88 |
| 3,893,378 | 7/1975 | Hewitt | 92/88 |
| 4,057,257 | 11/1977 | Berg . | |
| 4,121,840 | 10/1978 | Berg . | |
| 4,273,031 | 6/1981 | Hannon | 92/88 |
| 4,373,427 | 2/1983 | Garlapaty et al. | 92/88 |
| 4,545,290 | 10/1985 | Lieberman | 92/88 |
| 4,555,980 | 12/1985 | Hoglund | 92/88 |
| 4,693,177 | 9/1987 | Pankoke | 277/DIG. 7 |
| 4,724,744 | 2/1988 | Rosengren . | |
| 4,785,716 | 11/1988 | Vaughn et al. . | |
| 4,813,341 | 3/1989 | Vaughn . | |
| 4,829,881 | 5/1989 | Taki et al. | 92/88 |
| 4,852,465 | 8/1989 | Rosengren . | |

FOREIGN PATENT DOCUMENTS

| | | | |
|---|---|---|---|
| 0104364 | 4/1984 | European Pat. Off. | 92/88 |
| 2453948 | 5/1975 | Fed. Rep. of Germany | 92/88 |
| 2746718 | 4/1979 | Fed. Rep. of Germany | 277/DIG. 7 |
| 2943506 | 5/1981 | Fed. Rep. of Germany | 92/88 |

OTHER PUBLICATIONS

Norgren-Lintra Rodless Cylinders promotional material.
Origa Corp.-Rodless Cylinder promotional material.
Mosier Ind. Inc.-Tran-Sair Rodless Cylinder promotional material.

Primary Examiner—Edward K. Look
Assistant Examiner—Thomas Denion
Attorney, Agent, or Firm—Basile and Hanlon

[57] ABSTRACT

The present invention provides a single band disposed within the interior chamber of an elongated housing. The band is engageable with the interior wall of the housing, such that the band straddles an elongated slot passing through the housing of the fluid actuated motor. Seal members are disposed on both sides of the slot facing inwardly to engage with the single interior band to provide sealing of the slot in the pressurized areas of the rodless fluid actuated motor. In the preferred embodiment, overall load moving capability of the rodless fluid actuated motor is increased by providing an elliptical or oval-shaped piston reciprocally mounted within a correspondingly-shaped longitudinal aperture formed within the housing. Preferably, the slot passing through the housing is disposed along a generally flat planar portion of the longitudinal aperture, such as along the generally planar portion of the elliptical surface.

9 Claims, 3 Drawing Sheets

RODLESS FLUID ACTUATED MOTOR WITH IMPROVED SEALING CHARACTERISTICS

BACKGROUND OF THE INVENTION

I. Field of the Invention

The invention relates to fluid actuated motors, more specifically to rodless fluid actuated motors and, in particular, to oval rodless fluid actuated cylinders.

II. Description of the Prior Art

Rodless cylindrical piston fluid actuated motors are, generally speaking, known in the art. Several different configurations have been produced and are commercially available. For example, one manufacturer offers a rodless cylinder including a cylinder tube having an internal circular bore extending longitudinally through the cylinder tube. The cylinder tube is closed at the ends by first and second end caps. The internal longitudinal circular bore communicates with the exterior of the cylinder tube through a longitudinal slot through the wall of the cylinder tube. The internal chamber formed by the circular bore is sealed by a lip seal at each end of the circular piston disposed therein and flexible zip-lock-configured sealing strips. The two spaced cylindrical piston halves are joined by a yoke, and a carriage is carried externally of the cylinder tube while being connected to the yoke.

Another manufacturer provides a cylinder barrel which has a slit along its entire length. Force is transmitted by means of a lug screwed to the piston and projecting through the slit. A thin steel band covers the full length of the slit from the inside and provides sealing. The steel band runs under the lug between the two piston rubber seals. Another steel band covers the slit from the outside and prevents dirt from coming in. The two sealing bands are kept in place by permanent magnets located along the slit. The cylinders have square end covers retained by four screws. The nuts are recessed in the outer end cover surface and extend so that the outer part of the nut thread is used for the mounting bolts retaining the cylinder mounting to the end cover. Each end cover has an air connection port and a throttle screw for adjusting the required cushioning capacity. The piston is provided with plastic support rings and rubber seals at each end. The piston lug is designed as a double yoke to allow the two sealing bands to run through. The section of the lug running in the cylinder slit is fitted with plastic slide strips to absorb lateral forces. The sealing bands are made of hardened stainless steel. Piston seals and O-rings are made of oil resistant rubber. Cushioning results from the restriction of the exhaust air flow when the spigot enters the recess in the piston. The setting of the throttle screw determines the pressure rise in the trapped air, i.e. the back pressure which cushions the piston. In order that the piston may start its return stroke under full power, the cushion seal is designed to allow free passage of air for filling the cylinder chamber. Both of these configurations require inner and outer bands which connect with one another to effect sealing of the inner chamber. In the first manufacturer's configuration, the drive tongue that connects the yoke/piston with the carriage passes through the tube slot. The tube is sealed by a lip seal at each of the pistons and by flexible "zip-lock" configured plastic seals. As the piston moves, the flexible seals are separated by the yoke along the unpressurized area between the piston seals. The seals are then reconnected to maintain a seal along pressurized areas. In the second manufacturer's configuration, the two seals are separated by the yoke along the unpressurized area between the piston seals. The inner band engages the interior surface of the circular bore, while the outer band engages the exterior of the cylinder barrel, which supports longitudinal seals on the exterior surface of the cylinder barrel that come into contact with the outer band on either side of the longitudinal slot.

A third manufacturer provides a rodless cylinder with a pneumatic brake. The cylinder features a dual chamber tube with each chamber being isolated from the other. The lower (pressurized) chamber houses the power piston. Compressed air enters the lower chamber to push the power piston. The power piston is attached to the (non-pressurized) upper carriage by a high tensile stainless steel band which actually pulls the load. The high tensile stainless steel band is attached to the outer end faces of the internal power piston and communicates with the upper carriage by passing through the end caps being guided by pulleys located in each end cap prior to attachment to the respective outer end faces of the carriage. The power band is sealed at both ends of the (pressurized) lower chamber to prevent leakage. The carriage assembly includes a pneumatically actuated mechanical brake to stop and hold the moving load. Actuating a three-way normally closed valve to direct air into the brake assembly causes the brake boot and brake pads to expand and firmly grip the inner wall of the top chamber. The three-way brake valve can be signaled by a timer, electric lead switches or mechanical microswitches which can be mounted along the side of the cylinder.

SUMMARY OF THE INVENTION

It is desirable in the present invention to simplify the construction of rodless fluid actuated motors, while maintaining or improving the sealing characteristics of the rodless fluid actuated motors. It is also desirable in the present invention to increase the load moving capability of rodless fluid actuated motors, without greatly increasing the overall size and space requirements for rodless fluid actuated motor configurations.

These desirable characteristics are achieved in the present invention by providing a single band disposed within the interior chamber engageable with the interior wall of the chamber straddling the elongated slot passing through the casing of the fluid actuated motor, and providing sealing means disposed on either side of the slot facing inwardly to engage with the single interior band to provide sealing of the slot in the pressurized areas of the chamber. In the preferred embodiment, overall load moving capability of the rodless fluid actuated motor is increased by providing an elliptical or oval-shaped piston reciprocally mounted within a correspondingly-shaped longitudinal aperture formed within the casing. Improved sealing characteristics are also obtained by configuring the present invention such that the slot passing through the casing is disposed along a generally planar portion of the elliptical surfaces. A preferred configuration of the sealing means provides seals with outwardly extending angled portions extending into the interior chamber angled away from the elongated slot along the longitudinal length of the seals.

Other objects, advantages and applications of the present invention will become apparent to those skilled in the art when the following description of the best mode contemplated for practicing the invention is read in conjunction with the accompanying drawings.

BRIEF DESCRIPTION OF THE DRAWINGS

The description herein makes reference to the accompanying drawings wherein like reference numerals refer to like parts throughout the several views, and wherein.

DESCRIPTION OF THE PREFERRED EMBODIMENT

Figure 1:
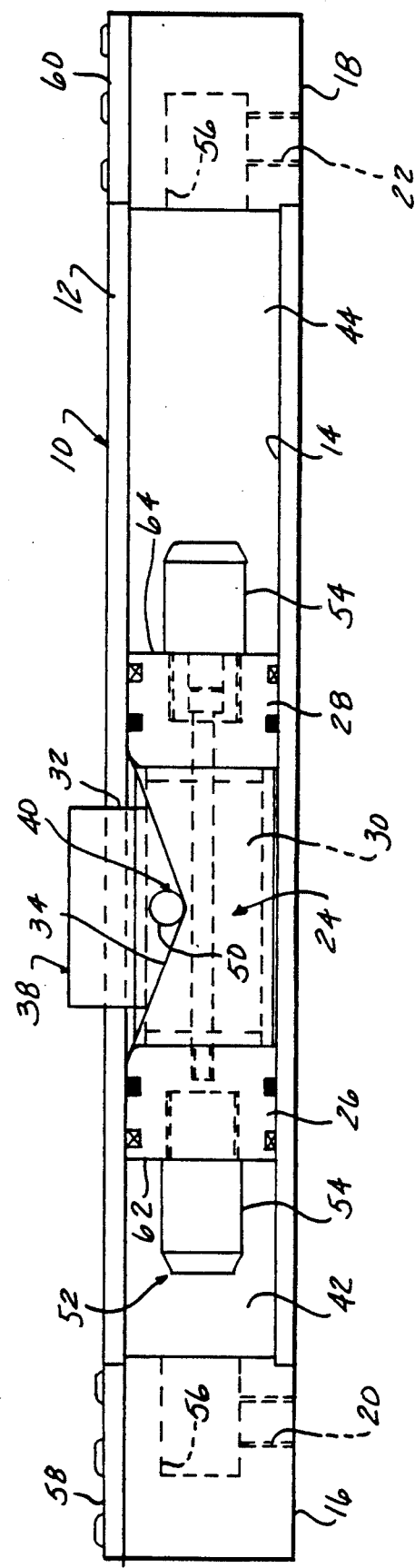
FIG. 1 is a partial cross-sectional view of a rodless fluid actuated motor according to the present invention.
Figure 2:
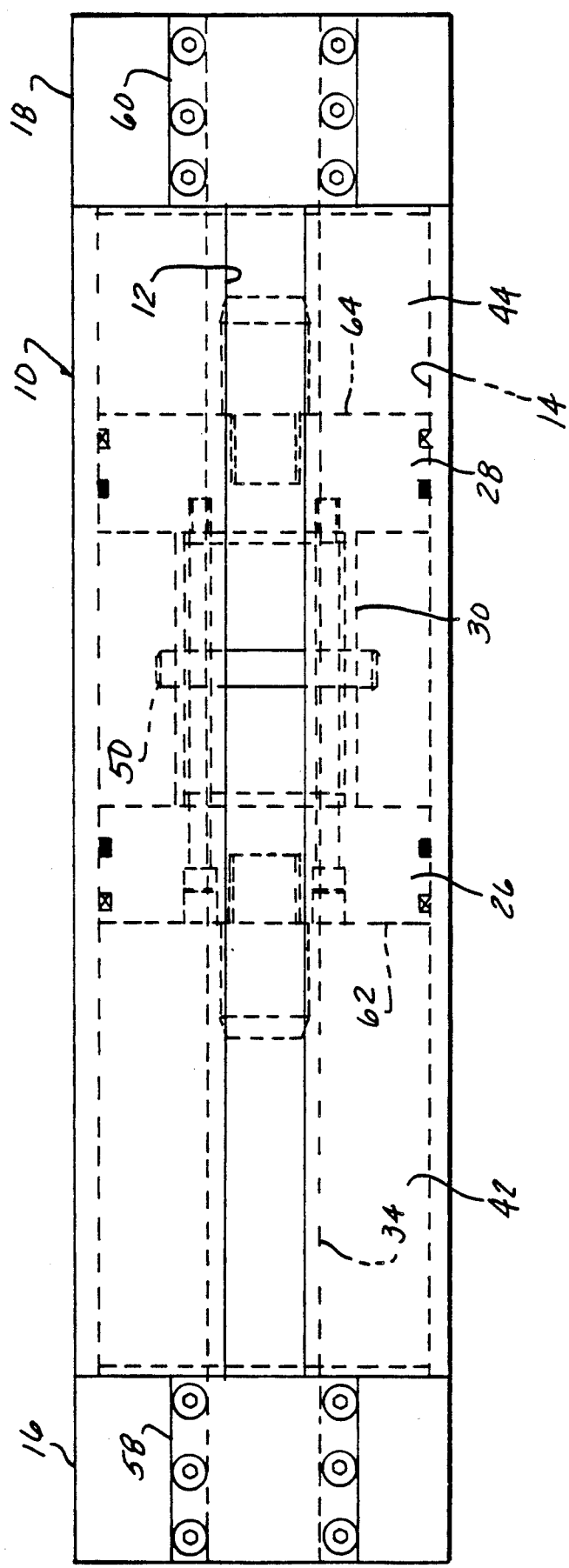
FIG. 2 is a plan view of the rodless fluid actuated motor of the present invention.
Figure 3:
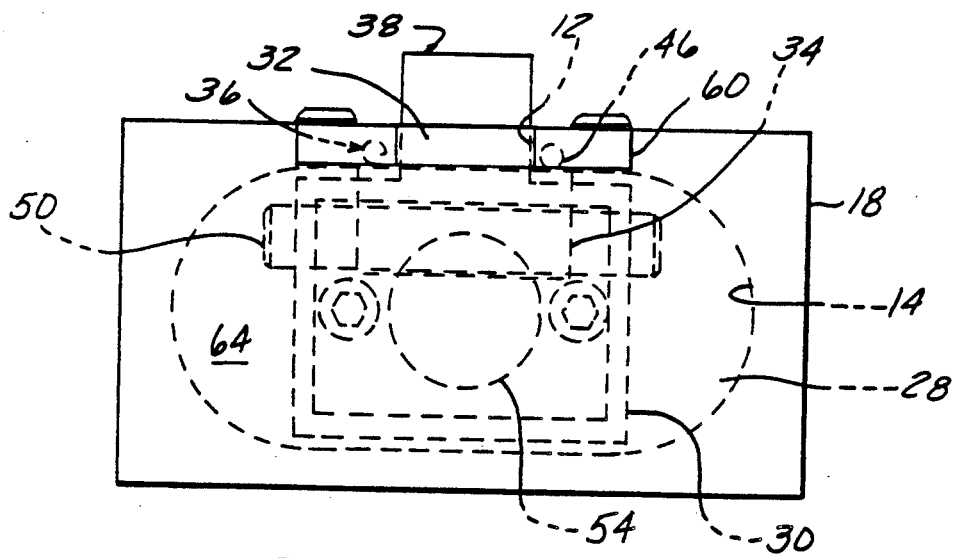
FIG. 3 is an end view of the rodless fluid actuated motor of the present invention.
Figure 4:
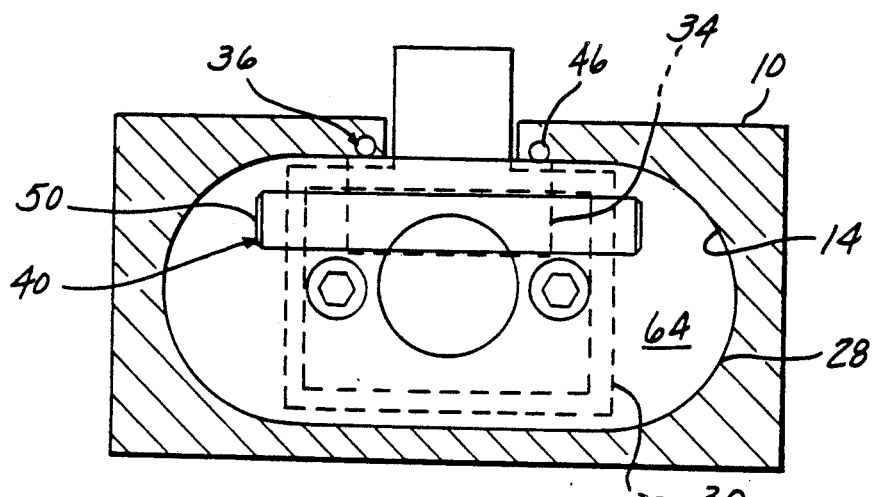
FIG. 4 is a cross-sectional view of the rodless fluid actuated motor according to the present invention.
Figure 5:
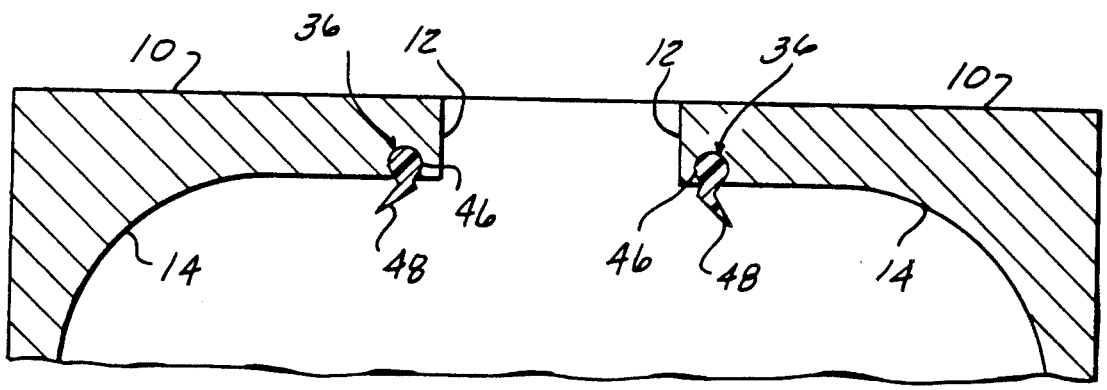
FIG. 5 is a detailed view of a preferred configuration of the sealing means.

The present invention of a rodless fluid actuated motor includes a casing, barrel or housing, generally designated as 10. The casing 10 is elongated along a longitudinal axis and is provided with a slit or radial slot 12 along its entire longitudinal length. The slot 12 is in communication with a longitudinal aperture 14 extending along the entire longitudinal length of the casing 10. The casing 10 has rectangular end covers or caps securely connected to the longitudinal ends of the casing 10 by suitable means, such as screws, bolts, welding or the like. Each end cover, 16 and 18 respectively, includes a port, 20 and 22 respectively, in communication with the interior longitudinal aperture 14 of the casing 10 for passage of fluid into and out of the longitudinal aperture 14. A piston member or assembly is slidably disposed within the longitudinal aperture 14 of the casing 10. The piston member, generally designated as 24, includes a first piston portion 26 longitudinally spaced from a second piston portion 28. The first and second piston portions, 26 and 28 respectively, are connected through a lug portion 30 of the piston member 24. The lug portion 30 includes a tongue 32 extending outwardly through the radial slot 12 in the casing 10. The tongue 32 of the lug portion 30 is connected to a carriage 38 which reciprocates externally of the casing 10 as the piston member 24 is reciprocated from one end limit of movement to the other end limit of movement along the longitudinal axis of the casing 10 in response to pressurized fluid being introduced into either end of the longitudinal aperture 14. The piston member 24 divides the longitudinal aperture 14 into two separate independent chambers 42 and 44, respectively. A band 34, preferably of hardened stainless steel, is disposed within the longitudinal aperture 14 and is engageable with the interior wall of the casing 10 straddling the radial slot 12. Seal means 36 are provided between the band 34 and the interior wall of the casing 10. Preferably, the seal means 36 is connected to the interior wall of the casing 10 and extends longitudinally along the radial slot 12 adjacent both sides of the radial slot 12. A preferred embodiment of the seal means can be seen in FIG. 5. The seal means is connected to the inner wall of the casing 10 on both sides of the radial slot 12. Each seal 46 preferably includes an outwardly extending angled lip portion extending toward the interior of the longitudinal aperture 14. Preferably, the angled lip portion 48 extends outwardly from the seal 46 in a direction away from the radial slot 12.

The lug portion 30 of the piston member 24 also includes means for unsealing the band 34. Unsealing means 40 draws the band 34 out of engagement with the seal means 36 allowing the tongue portion 32 of the piston member 24 to extend externally of the casing 10 for attachment to the carriage 38. The lug portion 30 is located within an unpressurized area between the first and second piston portions 26 and 28 respectively. The portion of the band 34 adjacent each piston portion reengages with the seal means 36 and the interior wall of the casing 10, providing the sealed chambers 42 and 44. In the preferred embodiment, unsealing means 40 can include yoke pin 50. The piston member 24 is reciprocated by introducing pressurized fluid at one end while the other end is exhausted. Cushioning means 52 can be provided on either of the first piston portions 26 and 28, or on both piston portions as desired. Cushioning results from the restriction of the exhaust fluid flow when the spigot 54 carried by the piston portion enters a recess 56 in the respective end cap of the casing 10. A throttle screw (not shown) can be provided to set the desired pressure rise in the trapped fluid, such that the desired back pressure which cushions the piston can be obtained. Band retaining plates 58 and 60 are provided on the end covers 16 and 18 respectively to secure the band 34 in the proper position under the appropriate tension. The band retaining plates 58 and 60 are connected to the end plates 16 and 18 respectively, by screws, bolts or the like.

Preferably, the first and second piston portions, 26 and 28 respectively, include piston heads 62 and 64 respectively having an oval or elliptical cross-sectional shape. The elliptical shape of the piston heads 62 and 64 provide a generally flat planar surface along at least one side of the piston head. A correspondingly shaped longitudinal aperture 14 is provided within the casing 10. Preferably, the radial slot 12 is formed in the casing 10, such that the radial slot opens into the longitudinal aperture 14 along the generally flat planar surface. By providing at least one generally flat planar surface along the piston heads 62 and 64, and the corresponding longitudinal aperture 14, the sealing characteristics of the rodless fluid actuated motor are improved. In addition, the load moving capacity of the rodless fluid actuated motor is increased, since a larger piston head surface area is provided.

While one embodiment of the invention has been described in detail, it will be apparent to those skilled in the art that the disclosed embodiment may be modified. Therefore, the foregoing description is to be construed as being exemplary rather than limiting, and the true scope of the invention is that defined in the following claims.

What is claimed is:

1. A rodless fluid actuated motor comprising:
an elongated housing having a longitudinally extending radial slot and a longitudinally extending aperture in communication with the radial slot;
a reciprocal piston member slidably disposed within the longitudinally extending aperture of the housing for reciprocal movement from one end limit of movement to another end limit of movement, the piston member having a first piston portion longitudinally spaced from a second piston portion, a lug portion connecting the first and second piston portions to one another, the lug portion having a tongue extending outwardly through the radial slot of the housing, a carriage connected to the tongue of the lug portion carried external of the housing and reciprocal with the piston member, the piston member dividing the longitudinal aperture into three separate independent chambers, a first expansible chamber disposed between the first piston portion and a first longitudinal end of the housing, a second expansible chamber disposed between the second piston portion and a second end of the housing, and a third chamber disposed between the first and second piston portions;

an elongated band extending longitudinally within the aperture of the housing, such that the band straddles the radial slot in the housing and is engageable with an interior surface of the longitudinally extending aperture;

elongated seal means extending longitudinally along the radial slot in the housing disposed between the band and the housing on both sides of the radial slot for releasably sealing the first and the second chambers within the housing, wherein said seal means includes first and second seal members supported on an interior surface of said longitudinally extending aperture of said housing;

band retaining means for securing the band to the housing while the band is in a state of tension; and means for unsealing the band supported by the lug portion of the piston member, wherein the piston member reciprocates from one end limit of movement to another end limit of movement within the housing as the first and second chambers expand and retract in response to fluid being introduced within one chamber while fluid is exhausted from the other chamber.

2. The rodless fluid actuated motor of claim 1 further comprising:

said piston member having at least one generally flat planar surface disposed longitudinally along the first and second piston portions; and said housing having a correspondingly shaped longitudinal aperture, wherein said radial slot communicates with said correspondingly shaped aperture longitudinally along the generally flat planar surface.

3. The rodless fluid actuated motor of claim 2 further comprising:

said piston member having first and second piston portions with elliptical piston head surfaces;

said housing having a longitudinally extending aperture with an elliptical cross section, wherein said radial slot extends longitudinally in a plane generally perpendicular to a plane defined in a major axis of the longitudinally extending elliptical aperture.

4. The rodless fluid actuated motor of claim 1, wherein said unsealing means comprises a yoke pin supported by said lug portion of said piston member, such that the band is drawn away from an interior surface of said housing around the yoke pin in the third chamber, allowing passage of the tongue of the piston member to extend outwardly through the radial slot of the housing.

5. The rodless fluid actuated motor of claim 1, further comprising:

cushioning means for decelerating the piston member adjacent each end limit of movement.

6. The rodless fluid actuated motor of claim 5, wherein said cushioning means further comprises:

a spigot attached to one of the first and second piston portions extending outwardly from the piston portion toward a longitudinal end of the housing; and a recess formed in the longitudinal end of the housing adapted to receive the spigot and to restrict the exhaust of fluid from the recess after the spigot enters the recess, while allowing free passage of fluid for filling the respective chamber when the piston member begins a return stroke.

7. The rodless fluid actuated motor of claim 1, wherein each seal is disposed adjacent an interior edge of said radial slot.

8. The rodless fluid actuated motor of claim 1, wherein each seal includes an outwardly extending lip portion angled away from the longitudinally extending radial slot.

9. A rodless fluid actuated motor comprising:

an elongated housing having a longitudinally extending radial slot and a longitudinally extending aperture in communication with the radial slot;

a reciprocal piston member slidably disposed within the longitudinally extending aperture of the housing for reciprocal movement from one end limit of movement to another end limit of movement, the piston member having a first piston portion longitudinally spaced from a second piston portion, a lug portion connecting the fist and second piston portions to one another, the lug portion having a tongue extending outwardly through the radial slot of the housing, a carriage connected to the tongue of the lug portion carried external of the housing and reciprocal with the piston member, the piston member dividing the longitudinal aperture into three separate independent chambers, a first expansible chamber disposed between the first piston portion and a first longitudinal end of the housing, a second expansible chamber disposed between the second piston portion and a second end of the housing, and a third chamber disposed between the first and second piston portions;

an elongated band extending longitudinally within the aperture of the housing, such that the band straddles the radial slot in the housing and is engageable with an interior surface of the longitudinally extending aperture;

elongated seal means extending longitudinally along the radial slot in the housing disposed between the band and the housing on both sides of the radial slot for releasably sealing the first and second chambers within the housing, wherein said seal means includes first and second seal members supported on an interior surface of said longitudinally extending aperture of said housing, each seal disposed adjacent an interior edge of said radial slot, and each seal including an outwardly extending lip portions angled away from the longitudinally extending radial slot;

band retaining means for securing the band to the housing while the band is in a state of tension; and means for unsealing the band supported by the lug portion of the piston member, wherein the piston member reciprocates from one end limit of movement to another end limit of movement within the housing as the first and second chambers expand and retract in response to fluid being introduced within one chamber while fluid is exhausted from the other chamber.

* * * * *